May 9, 1939.  W. D. ELLIS, 3D., ET AL  2,158,007
IRONER BELTING
Filed June 14, 1937   2 Sheets-Sheet 1
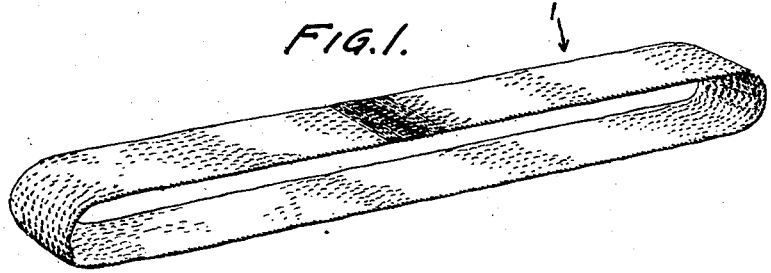
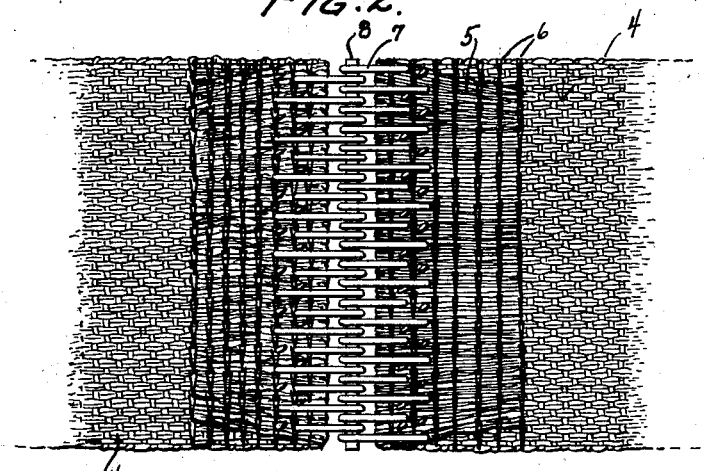
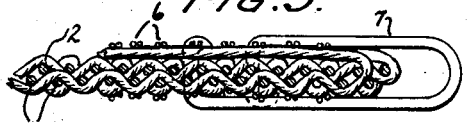
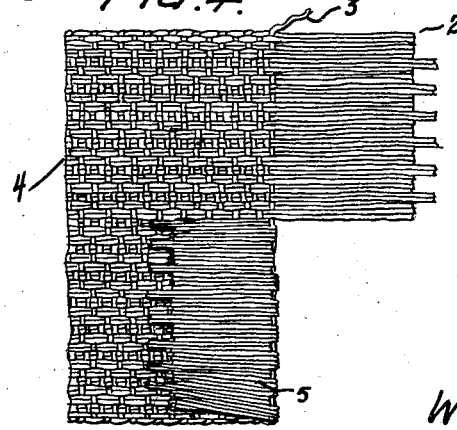
Inventors
WILLIAM D. ELLIS III
AND CLARENCE B. HAYDON
By Semmes & Semmes
Attorneys May 9, 1939.  W. D. ELLIS, 3D., ET AL  2,158,007
IRONER BELTING
Filed June 14, 1937  2 Sheets-Sheet 2

Inventors
WILLIAM D. ELLIS III
AND CLARENCE B. HAYDON
By Semmes & Semmes
Attorneys Patented May 9, 1939

2,158,007

UNITED STATES PATENT OFFICE 2,158,007

IRONER BELTING

William D. Ellis, III, Atlanta, Ga., and Clarence B. Haydon, Cincinnati, Ohio

Application June 14, 1937, Serial No. 148,222

8 Claims. (Cl. 24—31)

This invention relates to woven fabrics, and more particularly has reference to woven belting for laundry ironers. While we shall describe our invention with reference to a narrow belting, it will be of course appreciated that it finds application for feed aprons, delivery aprons and other types of endless belting used in laundries.

Various types of endless belts have heretofore been employed for delivering material to ironers and other laundry equipment, and removing the same therefrom. These belts have been of two general types. In one case the belt is woven endless, while in the other case the belts are woven in strips which are cut to the proper length and are then spliced or laced to form an endless belt.

Our invention relates to strip belts, the ends of which are laced together to form an endless structure. Heretofore, there has been no adequate preparation of the ends of such belts for the reception of the lacing means. The lacing has either been merely attached to the ends of the strip, or, in some instances the ends have been folded back and the lacing passed through the folded and contiguous portions at the end of the belt.

The object to the first method—that is merely passing the lacing through the end of the belt—has resided in the fact that there is no reinforcement afforded, and consequently there is a tendency for the lacing to tear the belting. When the end of the belting is folded back and the lacing passed therethrough, there is of course a protuberance formed which catches on the rolls and has a tendency to bind.

To overcome the above objections is one of the objects of our invention.

Another object of our invention is to provide a strip of woven belting, made endless by the use of lacing, that is of substantially uniform thickness and free from any appreciable irregularities at the junction.

Yet another object of our invention is to provide a strip of belting with its ends suitably reenforced for the reception of lacing.

To accomplish the above and other important objects, our invention in general embraces the broad concept of reenforcing the ends of the strip of woven belting in such a way that the reenforcement does not provide any appreciable increase in thickness of the belting. More specifically our invention contemplates the folding of the extreme ends of the belting strip and the preparation of such folded portion to afford a comparatively smooth surface.

In the two sheets of accompanying drawings there are depicted specific embodiments of our invention, it being understood that such drawings are merely illustrative of the inventive concept:

Figure 1 is a perspective view of a belting made endless in accordance with our invention;

Figure 2 is a detailed plan view of the junction of the belting shown in Figure 1;

Figure 3 is a detailed longitudinal sectional view of one of the ends of the belting shown in Figure 2;

Figure 4 is a plan view illustrating the steps involved in our invention;

Figure 5:
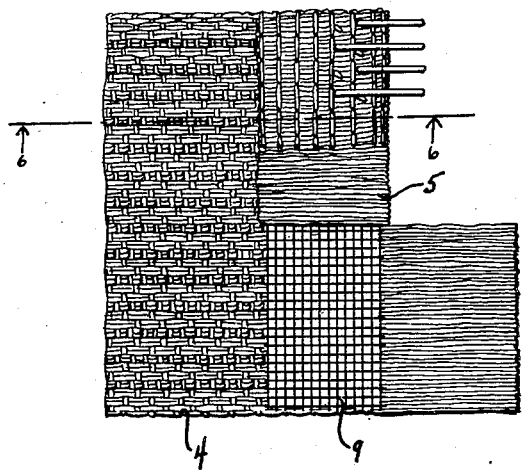
Figure 6:
Figure 7:
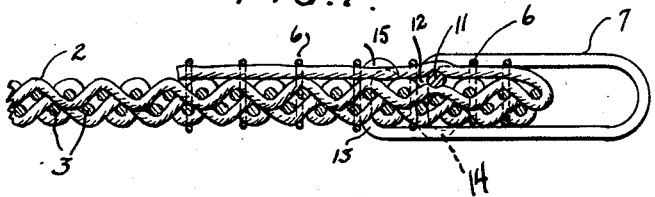
Figure 8:
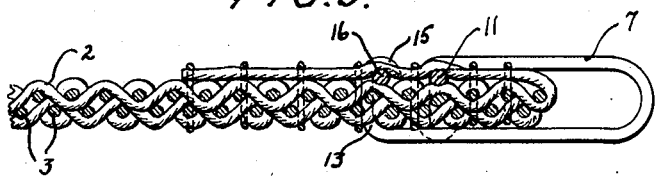

Figure 5 discloses a step in the manufacture of a modified form of our invention involving the use of a wire mesh;

Figure 6 is a longitudinal sectional view along the line 6—6 of Figure 5 looking in the direction of the arrows;

Figure 7 is a view similar to Figure 6, showing a further modification of our invention embracing the use of a single transverse wire;

Figure 8 is a view similar to Figure 7, disclosing the use of a pair of transverse wires.

Referring more particularly to Figure 1, it will be noted that a strip of woven belting material, designated generally 1, is provided, the ends of such strip being joined together to form an endless belt. As best shown in Figure 3, the belting is formed of warp 2 and woof 3 woven in any suitable manner to form what may be termed a normal weave, indicated generally as 4. The term "normal weave" is not to be taken as meaning necessarily a conventional weave (for any type of weave may be adopted), but refers to the regular weave, or body portion, of the belt as distinguished from the shredded portion, to be later described.

As indicated above, the normal weave of belting is not sufficient to withstand, over a period of operation, the strain imposed when the ends are laced. We provide reenforcement for the ends of the belting by shredding the ends, folding the ends back upon the normal weave 4, and securing the folded portion in such position. As best shown in Figure 4, the woof 3 is removed a suitable distance from the end of the belting, thus leaving the warp 2 free. This free warp is folded back as indicated generally at 5, and lies flat upon the normal weave 4.

While various means may be employed to secure the folded portion 5 flat upon the normal weave, we prefer stitching 6. Such stitching not only is the most convenient method of securing the folded warp to the normal weave, but is particularly desirable in view of the fact that it tends to flatten out the folded warp and to make a smoother surface. It will be noted, as best shown in Figure 3, that the stitching employed is relatively fine and close together.

The ends of belting treated as above described are appreciably strengthened and reenforced, and any desired type of lacing may be employed. We have shown in the drawings a so-called "clipper" lacing which comprises offset clasps 7 which pass through the reenforced end of the belting. It will be observed that the clasps 7 engage not only the normal weave 4 but also the folded warp 5 and the stitching 6. With such reenforcement we have found that there is little or no tendency for the clasps to be torn from the belting.

A rod 8 passes through the offset clasps 7, thus securing together the opposed ends of the belting but at the same time providing a pivotal joint.

The reenforcement provided by the above method of preparing the ends of the belting is usually sufficient for all normal operations. However, if occasion should demand, additional reenforcing may be provided by the use of a relatively light wire mesh. One of the preferred ways of incorporating such a wire mesh is disclosed in Figures 5 and 6, where it will be observed that the mesh 9 is inserted intermediate the folded warp 5 and the normal weave 4. The mesh 9 is preferably formed of relatively fine wire of fairly coarse mesh. It will therefore be observed that such a mesh affords little or no obstruction to the passage of the clasps 7 through the reenforced section. Furthermore, and particularly when the wire is relatively fine, the inclusion of such mesh does not add any appreciable thickness to the reenforced ends. At the same time, it will be appreciated, the wire mesh does add a certain strength to the ends of the belting.

Still another method of increasing the strength of the ends of the belting, over that shown by the reenforcement of Figures 1 through 4, is by inserting a wire, or wires, intermediate the folded portion 5 and the normal weave 4. For instance in Figure 7 there is shown such a wire 11 which extends transversely of the belting and is so positioned that it is engaged by one of the prongs of the clasp 7. It will be noted that each clasp includes prongs 12 and 13 which pass through the reenforced end, and the free ends of which are bent over as at 14 and 15 respectively. As shown in Figure 7, the single wire 11 which is employed is held in place by the stitching 6, and is located in the reenforcement at a place where it is engageable by the prong 12.

If desired two wires may be used, as shown in Figure 8. It will be noted that the wire 11 is engaged by a prong 12 as in the case of Figure 7, but additionally a wire 16 is also inserted which is engageable by prong 13 and its bent end 15. Obviously it is preferable to avoid the use of a sufficiently large wire 11 or 16 to measurably distort the end; and, inasmuch as the function of such wire or wires is to distribute the strain, it will be appreciated that a relatively light wire will suffice.

The advantages of our invention will be readily apparent. As indicated above, it increases the strength of the belt ends, thereby preventing the lacing from pulling out, and at the same time it does not appreciably increase the thickness of the ends, thus preventing the belt from catching or binding on the rolls. It will also be obvious that the reenforcement afforded by any one of the above embodiments may be secured with a minimum additional cost.

As indicated above, our invention is equally applicable to feed aprons, delivery aprons, and in general to any woven strip where it is desired to form an endless structure therefrom. Consequently, the use of the term "belt" in the following claims is not to be limitatively construed, but is to include such other types of endless structure. In general our invention is to be defined only by the scope of the appended claims.

We claim:

1. A web having a cut end which is reinforced by having superimposed therein and secured thereto the warp threads of a shredded extension.

2. A web having a cut end which is reinforced by having superimposed thereon and secured thereto thereto the warp threads of an extension from which the woof threads have been removed.

3. A web having a cut end which is reinforced by having superimposed thereon and secured thereto a shredded extension of normal weave, and connecting means secured to said reinforced end and adapted for connection to another web end.

4. A web of normal weave having a cut end which is reinforced by having superimposed thereon and secured thereto a shredded extension of normal weave, said extension being folded flat and securely held upon the normal weave by means of stitching.

5. A web of normal weave having a cut end which is reinforced by having superimposed thereon and secured thereto a shredded extension of normal weave, said extension being folded flat and secured upon the normal weave by means of transverse rows of stitching, said ends of the web adapted to receive clipper type fasteners so that the ends of each fastener can be hooked between rows of stitching.

6. A web of normal weave having a cut end, woof threads having been removed from a section of said web adjacent the cut end thereby exposing a portion of the warp threads, said exposed portion being folded back adjacent one surface of the web, said exposed warp threads nearest the edges of the web having their exposed portions directed inwardly away from said edges, and means for attaching said exposed portion to the web.

7. A web of normal weave having a cut end, woof threads having been removed from a section of said web adjacent the cut end, thereby exposing a portion of the warp threads, said exposed portion being folded back adjacent one surface of the web, some of said exposed warp threads being shortened to present their ends in staggered array, and means for attaching said exposed portion to the web.

8. A web of normal weave having a cut end from which woof threads have been removed in a section adjacent said cut end, said cut end being reinforced by a folding back of the exposed warp threads and by having a plurality of transverse rows of chain stitching securing the folded back warp threads to the normal weave.

WILLIAM D. ELLIS, III.
CLARENCE B. HAYDON.